United States Patent
Asai

(10) Patent No.: US 9,348,673 B2
(45) Date of Patent: May 24, 2016

(54) INFORMATION PROCESSING DEVICE AND CONTROL METHOD OF SHARING IMAGE DATA TO PLURAL APPLICATIONS

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/572,962

(22) Filed: Dec. 17, 2014

(65) Prior Publication Data

US 2015/0169391 A1   Jun. 18, 2015

(30) Foreign Application Priority Data

Dec. 17, 2013   (JP) ................. 2013-260137

(51) Int. Cl.
  *G06F 13/00* (2006.01)
  *G06F 9/54* (2006.01)
  *H04N 1/00* (2006.01)

(52) U.S. Cl.
  CPC . *G06F 9/543* (2013.01); *H04N 1/00* (2013.01)

(58) Field of Classification Search
  CPC ............................. G06F 9/4443; G06F 9/546
  USPC ................................. 719/313, 329
  See application file for complete search history.

(56) References Cited

U.S. PATENT DOCUMENTS

| 6,049,390 | A  | 4/2000 | Notredame et al. |
| 6,259,456 | B1 | 7/2001 | Gibson et al. |
| 6,707,463 | B1 | 3/2004 | Gibson et al. |
| 6,775,678 | B1 | 8/2004 | Hillberg |
| 7,543,246 | B2 | 6/2009 | Mifune |
| 7,911,643 | B2 | 3/2011 | Yamada et al. |
| 9,294,647 | B2 | 3/2016 | Yamada et al. |
| 2001/0040589 | A1 | 11/2001 | De Bliek et al. |

(Continued)

FOREIGN PATENT DOCUMENTS

| JP | 4-190421 A | 7/1992 |
| JP | 5-257669 A | 10/1993 |

(Continued)

OTHER PUBLICATIONS

Related U.S. Appl. No. 14/338,723, filed Jul. 23, 2014.

(Continued)

*Primary Examiner* — Andy Ho
(74) *Attorney, Agent, or Firm* — Merchant & Gould P.C.

(57) ABSTRACT

An information processing device of this disclosure has: a data sharing unit capable of sharing, the sharing being a process of causing an application, selected as data output destination from a plurality of applications, to process data output from a data output source application; a display unit; an operation unit; and a processor that, when executing instructions, performs: acquiring image data; displaying identification images for identifying the plurality of applications on the display unit; and receiving an input designating N identification images of the plurality of identification images displayed on the display unit from the operation unit, N being natural number greater than 1; and causing the data sharing unit to perform sharing the acquired image data to each of N data output destination application, each of N data output destination application respectively corresponding to each of the N identification images.

20 Claims, 8 Drawing Sheets

(56) References Cited

U.S. PATENT DOCUMENTS

| | | |
|---|---|---|
| 2003/0099379 A1 | 5/2003 | Monk et al. |
| 2003/0154207 A1 | 8/2003 | Naito |
| 2003/0184803 A1 | 10/2003 | Yamada et al. |
| 2005/0063004 A1 | 3/2005 | Silverbrook et al. |
| 2005/0114766 A1 | 5/2005 | Yamamoto |
| 2005/0229010 A1 | 10/2005 | Monk et al. |
| 2006/0028675 A1 | 2/2006 | Watanabe et al. |
| 2006/0055766 A1 | 3/2006 | Kawata et al. |
| 2006/0066621 A1 | 3/2006 | Herceg et al. |
| 2008/0068640 A1 | 3/2008 | Todaka |
| 2008/0212129 A1 | 9/2008 | Yoshiida |
| 2008/0282065 A1 | 11/2008 | Imamichi |
| 2009/0034782 A1 | 2/2009 | Gering |
| 2009/0051947 A1 | 2/2009 | Kuroshima |
| 2009/0109483 A1 | 4/2009 | Shimmoto |
| 2009/0161970 A1 | 6/2009 | Harada |
| 2009/0244592 A1 | 10/2009 | Grams |
| 2009/0324013 A1 | 12/2009 | Tanaka |
| 2010/0027062 A1 | 2/2010 | Takashima |
| 2010/0053696 A1 | 3/2010 | Sasano et al. |
| 2010/0118338 A1 | 5/2010 | Sakiyama et al. |
| 2010/0118344 A1 | 5/2010 | Asano |
| 2011/0004830 A1 | 1/2011 | Von Kaenel et al. |
| 2011/0047450 A1 | 2/2011 | Park et al. |
| 2011/0099093 A1 | 4/2011 | Mills |
| 2011/0161076 A1 | 6/2011 | Davis et al. |
| 2011/0225490 A1 | 9/2011 | Meunier |
| 2011/0296439 A1 | 12/2011 | Kozaki |
| 2012/0063700 A1 | 3/2012 | Ignatchenko et al. |
| 2012/0243043 A1 | 9/2012 | Asai |
| 2012/0293832 A1 | 11/2012 | Fujita |
| 2012/0307275 A1 | 12/2012 | Tamashima |
| 2013/0063619 A1 | 3/2013 | Asai |
| 2013/0076705 A1 | 3/2013 | Murata |
| 2013/0094005 A1 | 4/2013 | Kobayashi |
| 2013/0195421 A1 | 8/2013 | Chen et al. |
| 2014/0002857 A1 | 1/2014 | Huang et al. |
| 2014/0365919 A1* | 12/2014 | Shaw et al. .................. 715/753 |
| 2015/0128067 A1* | 5/2015 | Wong et al. .................. 715/748 |

FOREIGN PATENT DOCUMENTS

| | | |
|---|---|---|
| JP | 11-65795 A | 3/1999 |
| JP | 2003-241879 A | 8/2003 |
| JP | 2004-7517 A | 1/2004 |
| JP | 2005-049928 A | 2/2005 |
| JP | 2006-86727 A | 3/2006 |
| JP | 2008-236421 A | 10/2008 |
| JP | 2012-203742 A | 10/2012 |
| JP | 2013-58114 A | 3/2013 |
| WO | 2008/041318 A1 | 4/2008 |

OTHER PUBLICATIONS

Japan Patent Office, Notification of Reasons for Refusal for Japanese Patent Application No. 2011-069000 (counterpart Japanese patent application), dispatched Feb. 26, 2013.

Office Action in related U.S. Appl. No. 14/338,723, mailed Apr. 6, 2015.

Final Office Action issued in related U.S. Appl. No. 14/338,723, Nov. 19, 2015.

Office Action issued in related U.S. Appl. No. 14/338,723, Apr. 8, 2016.

* cited by examiner

INFORMATION PROCESSING DEVICE AND CONTROL METHOD OF SHARING IMAGE DATA TO PLURAL APPLICATIONS

CROSS-REFERENCE TO RELATED APPLICATION

This application claims priority from Japanese Patent Application No. 2013-260137 filed on Dec. 17, 2013, the entire subject matter of which is incorporated herein by reference.

TECHNICAL FIELD

A technology disclosed in the specification relates to an information processing program and the like causing a plurality of applications to share a variety of data.

BACKGROUND

Some mobile terminals have a function called a 'sharing function'. The sharing function is a function of transmitting data processed in one application to another application and causing the other application to process the data. For example, when acquiring image data by a digital camera embedded in a mobile terminal and generating a JPEG file from the image data by a camera application, it is possible to transmit the JPEG file to an electronic mail application and to make the electronic mail application attach the JPEG file to an electronic mail and transmit the electronic mail by the sharing function. Like this, according to the sharing function, it is possible to couple a plurality of applications, thereby causing the mobile terminal to execute a variety of processing. In the meantime, the application configured to process the JPEG file is not limited to the electronic mail application. That is, there may be a plurality of applications supporting processing of a JPEG file. For example, there is a technology for activating different JPEG applications, depending on folders having JPEG files stored therein.

SUMMARY

When coupling the plurality of application, it is necessary to iteratively perform an operation of sharing data in each of the plurality of applications. Therefore, it cannot be said that usability is good.

A non-transitory computer readable medium of this disclosure stores instructions, which is read in an information processing device having: a data sharing unit capable of sharing, the sharing being a process of causing an application, selected as data output destination from a plurality of applications, to process data output from a data output source application; a display unit; an operation unit; and a processor, the instructions, when executed by the processor, causing the information processing device to perform: acquiring image data; displaying identification images for identifying each of the plurality of applications on the display unit; receiving an input designating N identification images of the plurality of identification images displayed on the display unit from the operation unit, N being natural number greater than 1; and causing the data sharing unit to perform sharing the acquired image data to each of N data output destination application, each of N data output destination application respectively corresponding to each of the N identification images.

According to the above information processing and the like described in the specification, the data sharing unit can be enabled to execute the operation of making each of the N data output destination applications to process the image data acquired by the image data acquisition means. Thereby, it is not necessary for a user to repeatedly perform the operation for causing the plurality of data output destination applications to process the image data, with respect to each of the plurality of data output destination applications. Therefore, it is possible to improve the convenience.

In the meantime, the technology disclosed in the specification can be implemented in various forms such as an information processing device, a control device configured to control the information processing device, an information processing system, an information processing method, a recording medium having the information processing program recorded therein, and the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

[First Illustrative Embodiment]

Figure 1:
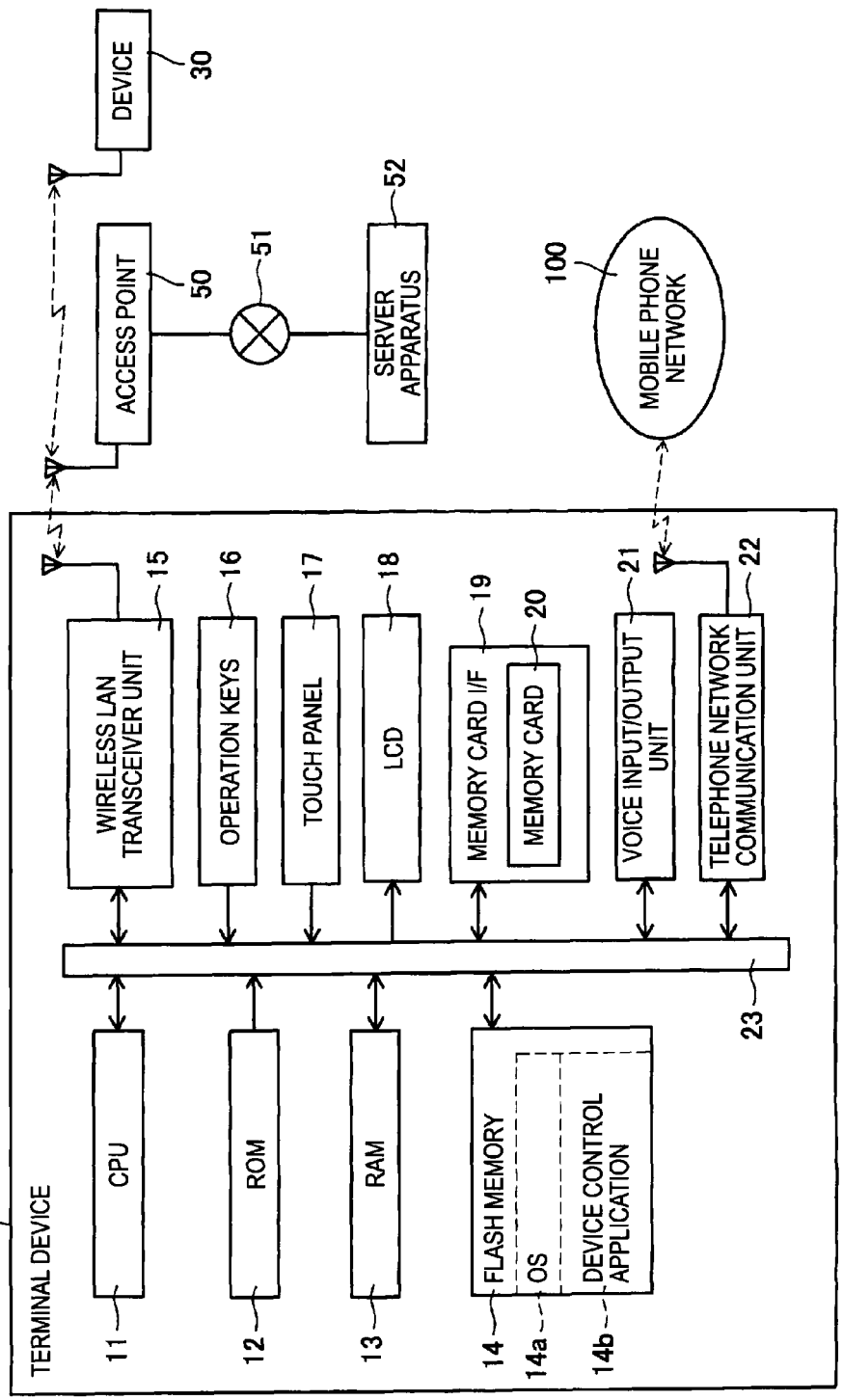
FIG. 1 is a block diagram illustrating an electrical configuration of a mobile terminal having a device control application mounted thereon.

Hereinafter, preferred embodiments of the present invention will be described with reference to the accompanying drawings. FIG. 1 is a block diagram illustrating an electrical configuration of a mobile terminal 10 having a device control application 14b (hereinafter, also referred to as the present application 14b), which is an illustrative embodiment of the present invention.

The mobile terminal 10 is a mobile phone capable of making a voice call to another apparatus through a mobile phone network 100, or using the Internet 51. Also, the mobile terminal 10 is configured to perform wireless communication with a device 30 by an infrastructure mode through an access point 50. Further, the mobile terminal 10 is configured to perform a variety of communications with a server apparatus 52 through the access point 50 and the Internet 51. The server apparatus 52 is an apparatus capable of storing therein a variety of data such as image data.

The mobile terminal 10 includes a CPU 11, a ROM 12, a RAM 13, a flash memory 14, a wireless LAN transceiver unit 15, operation keys 16, a touch panel 17, a liquid crystal display device 18 (hereinafter, also referred to as LCD 18), a memory card interface 19 (hereinafter, also referred to as memory card I/F 19), a voice input/output unit 21, and a telephone network communication unit 22. These are connected to one another through a bus line 23.

The CPU 11 is configured to control each unit connected to the bus line 23, in response to fixed values, programs and the like stored in the ROM 12 and the like. The ROM 12 is a non-rewritable non-volatile memory, and the RAM 13 is a rewritable volatile memory. The flash memory 14 is a rewritable non-volatile memory and is configured to store therein an operating system 14a (hereinafter, also referred to as OS 14a), the present application 14b, and a plurality of other applications (not shown). The flash memory 14 is preferably a computer-readable storage medium. The computer-readable storage medium refers to a non-transitory medium. Electric signals transmitting programs downloaded from a server and the like on the Internet are not included in the non-transitory medium.

The plurality of applications includes an application supporting an EDIT action (hereinafter, referred to as EDIT application), and an application supporting a SEND action (hereinafter, referred to as SEND application). The EDIT application is an editing application for editing image data. As the EDIT application, an image forming application and an image editing application may be exemplified. The SEND application is an application for outputting the image data to an apparatus different from the mobile terminal 10. The concept of the output of the image data includes mail transmission to a mail receiving apparatus (not shown), data transmission to the server apparatus 52, data storing into a memory card 20 mounted to the memory card interface 19, and the like. As the SEND application, a mail application for preparing, transmitting and receiving a mail, an application for a social networking service (also referred to as SNS), an application for uploading or downloading data to or from a storage on the network, and the like may be exemplified.

The CPU 11, the ROM 12, the flash memory 14, and the like are computer-readable storage media and are non-transitory media. Electric signals transmitting programs downloaded from a server or the like on the Internet are not included in the non-transitory media.

The OS 14a is basic software for implementing the standard functions of the mobile terminal 10. In the illustrative embodiment, the OS 14a is an Android (registered trademark of Google Inc.) OS. The present application 14b is an application provided by a vender of the device 30 and is installed in the mobile terminal 10 by a user.

Points that should be noted with respect to descriptions in the specification will be described. Hereinafter, the CPU 11 configured to execute a program such as the application, the operating system and the like may be simply referred to as a name of the program. For example, the description 'an application' may also mean the 'CPU 11 configured to execute the application'. In the specification, the description 'the CPU 11 of the mobile terminal 10 is configured to receive a variety of information' includes the technology content 'the CPU 11 of the mobile terminal 10 is configured to acquire a variety of information through the wireless LAN transceiver unit 15'. Also, the description 'the CPU 11 of the mobile terminal 10 is configured to transmit a variety of information' includes the technology content 'the CPU 11 of the mobile terminal 10 is configured to output a variety of information through the wireless LAN transceiver unit 15'.

An API of the OS 14a installed in the mobile terminal 10 is used by the application, so that a sharing function (also referred to as intent function) of transmitting and receiving data between the applications is implemented. Also, the present application 14b installed in the mobile terminal 10 is an application for directly using a printing function and a scanning function of the device 30 from the mobile terminal 10, not through a personal computer (PC) or the like. In particular, the present application 14b is configured to have good usability when using the sharing function to transmit image data acquired from the device 30 to another application.

The wireless LAN transceiver unit 15 is a circuit for establishing a Wi-Fi (registered trademark of Wi-Fi Alliance) connection between the mobile terminal 10 and another device by a wireless LAN based on the standards of 802.11b/g of IEEE. By the wireless LAN transceiver unit 15, the mobile terminal 10 is wirelessly connected to the device 30 through the access point 50. Also, the mobile terminal 10 is connected to the server apparatus 52 through the access point 50 and the Internet 51.

The operation keys 16 are hard keys provided on a housing of the mobile terminal 10 and are configured to input setting information and instructions to the mobile terminal 10. The touch panel 17 is provided with overlapping the LCD 18 and is configured to input setting information and instructions to the mobile terminal 10. The LCD 18 is configured to display a variety of operation screens and images based on selected data. The memory card I/F 19 is an interface, to which the non-volatile memory card 20 is mounted and is configured to control writing or reading of data into or from the memory card 20. As the memory card 20, an SD card (registered trademark of SD-3C, LLC) may be exemplified. In this illustrative embodiment, the present application 14b is configured to convert image data received from the device 30 into a PDF file (hereinafter, also referred to as PDF data) or JPEG file (hereinafter, also referred to as JPEG data) and to store the file in the memory card 20. The format of PDF data is a data structure capable of preparing one PDF data including multiple pages. The format of JPEG data is a data structure incapable of including multiple pages. Here, the multiple pages are data of a plurality of pages.

The voice input/output unit 21 is a voice input/output device composed of a microphone, a speaker, and the like, and the telephone network communication unit 22 is a circuit for performing communication through the mobile phone network 100. The mobile phone network 100 is a communication network based on IMT-2000 (the abbreviation for International Mobile Telecommunication-2000), and makes it possible for the mobile terminal 10 to perform voice communication.

In the meantime, each application installed in the mobile terminal 10 is configured to call the API of the OS 14a and to output data desired to be transmitted to each configuration of the mobile terminal 10, such as the wireless LAN transceiver unit 15, the operation keys 16, the touch panel 17, the LCD 18, the memory card I/F 19, the voice input/output unit 21, the telephone network communication unit 22 and the like, to the OS 14a. Each application includes the present application 14b. That is, each application is configured to call the API of the OS 14a, thereby controlling each configuration of the mobile terminal 10. Also, each application is configured to call the API of the OS 14a, thereby acquiring data output from each configuration of the mobile terminal 10 or data representing states of the respective configurations from the OS 14a. That is, each application is configured to call the API of the OS 14a, thereby acquiring data representing the states of the respective configurations of the mobile terminal 10 from the OS 14a. The states of the respective configurations of the mobile terminal 10 also include the input states of operations on the mobile terminal 10. Also, regularly, or whenever the states of the respective configurations are changed, the OS 14a notifies each application of the data output from the respective configurations of the mobile terminal 10 and the data representing the states of the respective configurations.

That is, each application is configured to receive a notification from the OS 14*a*, thereby acquiring the data representing the states of the respective configurations of the mobile terminal 10 from the OS 14*a*.

The device 30 is a complex device having a printer function, a scanning function, a copying function and the like, includes a wireless LAN transceiver unit (not shown) configured in the same manner as the wireless LAN transceiver unit 15 of the mobile terminal 10 and is configured to establish the Wi-Fi connection with the mobile terminal 10 by the wireless communication through the access point 50. Also, the device 30 is controlled by the present application 14*b* of the mobile terminal 10 and is configured to print an image on the basis of data transmitted from the mobile terminal 10 or to read a document, to generate image data and to transmit the image data to the mobile terminal 10. The device 30 may include an ADF (the abbreviation for Auto Document Feeder). The device 30 may be configured so that when a plurality of documents is set and one scanning execution instruction is input to the device 30, the plurality of documents is automatically scanned and a plurality of image data is thus generated. Here, a set of a plurality of image data that is generated in response to one scanning execution instruction is defined as an 'image data set'. Also, each of one or more image data included in an image data set may be associated with a characteristic of the corresponding image data. As the characteristic of the image data, an image size (for example, an A4 size, an L size and the like), an image type (for example, a text image, a photographic image and the like) and the like may be exemplified. The characteristic of the image data may be included in header information of the image data.

Points that should be noted with respect to descriptions in the specification will be described. In the specification, the description 'the CPU 11 of the mobile terminal 10 is configured to receive a variety of information' includes the technology content 'the CPU 11 of the mobile terminal 10 is configured to acquire a variety of information through the wireless LAN transceiver unit 15'. Also, the description 'the CPU 11 of the mobile terminal 10 is configured to transmit a variety of information' includes the technology content 'the CPU 11 of the mobile terminal 10 is configured to output a variety of information through the wireless LAN transceiver unit 15'.

Here, the definitions of the terms 'data' and 'information' will be described. In the specification, the term 'information' of the terms 'data' and 'information' is used as a broader concept than the term 'data'. For this reason, 'A data' may be restated as 'A information'. Also, 'information' is considered as the same information as 'data' inasmuch as it is recognized as the same meaning content, even though a format as 'data' (for example, a text format, a binary format, a flag format and the like) is different. For example, as long as an apparatus considers data as information indicating that a number of sheets to be printed is two copies, data of a text format 'COPY=2' and data of a binary format '10' are considered as the same information. However, the discrimination between 'data' and 'information' is not strict and an exceptional handling is also permitted.

<Sharing Function>

Figure 2A:
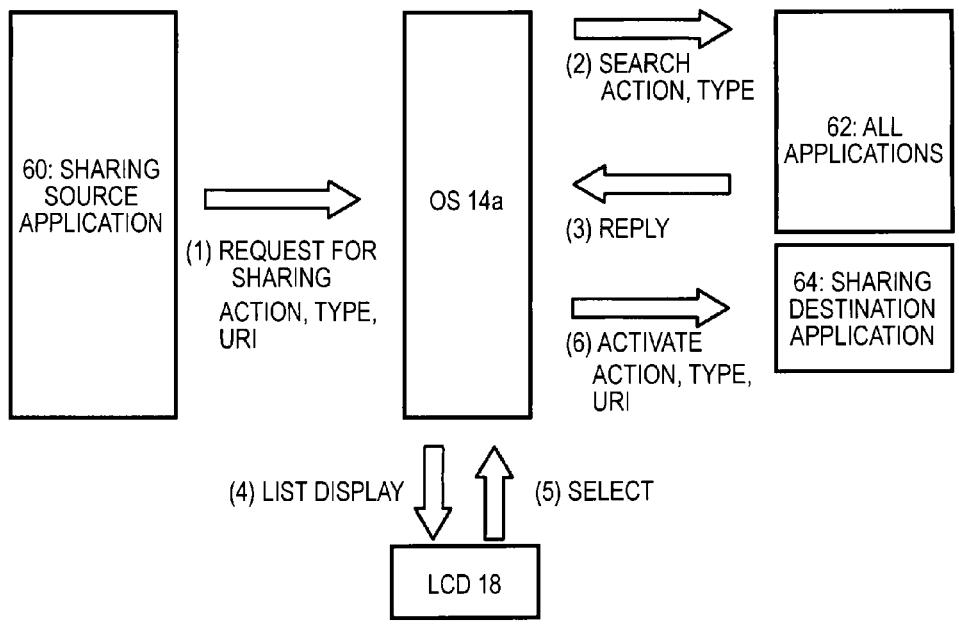
FIGS. 2A and 2B illustrate a sharing function.

The sharing function that is implemented by using the API of the OS 14*a* of the mobile terminal 10 is described with reference to FIG. 2. The sharing function is a function of causing an application, selected as a data output destination, to process data output from an application of a data output source. As the sharing function, there are an implicit sharing function and an explicit sharing function. FIG. 2A is a view illustrating the implicit sharing function, and shows a processing flow in a case where an application of a data output source (hereinafter, also referred to as sharing source application 60) requests the OS 14*a* to execute the implicit sharing function.

As shown in FIG. 2A, in the implicit sharing function, in Step (1), the sharing source application 60 calls the API of the OS 14*a* and requests execution of the sharing function. The request includes a URI (the abbreviation for Uniform Resource Identifier) and a type of data (hereinafter, also referred to as shared data) to be processed in another application by the sharing function, and an action. The URI is information indicating a location of the shared data and is composed of a file path in this illustrative embodiment. The type is information designating a format of the shared data, and the action is information designating a processing kind. In Step (2), the OS 14*a* sets the type and action notified from the sharing source application 60, as search conditions, and searches a candidate capable of becoming an application of a data output destination application (hereinafter, also referred to as sharing destination application 64) from all applications (hereinafter, also referred to as all applications 62) installed in the mobile terminal 10.

Each application installed in the mobile terminal 10 presets a type designating a format that can be processed by the supporting application, and an action designating a kind of executable processing. Therefore, the OS 14*a* sets the type and action notified from the sharing source application 60, as search conditions, and searches all applications 62. The OS 14*a* extracts an application capable of processing data of a format designated by the type notified from the sharing source application 60 and supporting a processing kind designated by the action notified from the sharing source application 60, and acquires the identification information of the extracted application, in Step (3). The type and action declared by each application can be freely set by a developer of the supporting application. Therefore, each application may declare processing that cannot be actually executed by the supporting application, as an action. Therefore, an 'application supporting a processing kind designated by an action notified from the sharing source application 60' means an application preset the same action as the action notified from the sharing source application 60, and does not necessarily require that the application can actually execute the corresponding processing.

Next, in Step (4), the OS 14*a* displays a list of the searched applications, that is, the applications that are candidates for the sharing destination application 64 on the LCD 18. Then, when the user selects any one from the list (Step (5)), in Step (6), the OS 14*a* activates the selected sharing destination application 64, sets a screen of the sharing destination application 64 as the foreground (also referred to as front), and notifies the URI and type of the shared data and the action notified from the sharing source application 60.

As a result, the screen of the sharing destination application 64 selected by the user is displayed in the foreground, and the sharing destination application 64 accesses the shared data specified by the notified URI, and performs processing in accordance with a value of the action. The sharing destination application 64 performs a variety of processing, such as displaying processing, processing of attaching the shared data to an electronic mail and transmitting the electronic mail, and editing processing.

Figure 2B:
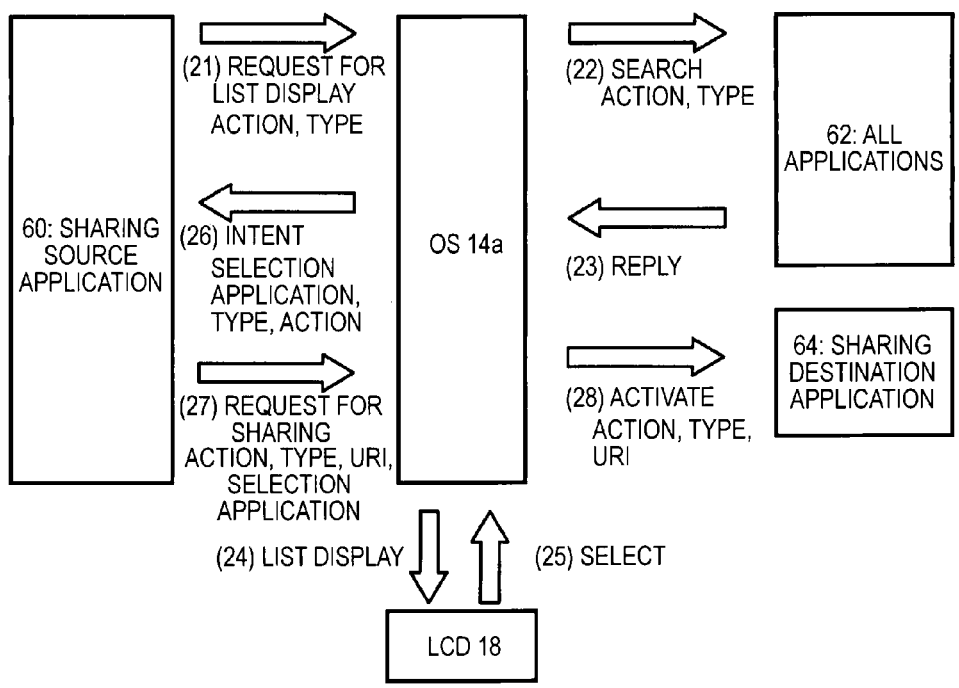

FIG. 2B is a view illustrating the explicit sharing function, and shows a processing flow in a case where the sharing source application 60 requests the OS 14*a* to execute the explicit sharing function.

As shown in FIG. 2B, in the explicit sharing function, in Step (21), the sharing source application 60 calls the API of the OS 14a, and requests display of a list of candidates for the sharing destination application 64. The request includes a type of shared data, and an action. The OS 14a sets the type and action notified from the sharing source application 60, as search conditions, and searches a candidate for the sharing destination application 64 from all applications 62 installed in the mobile terminal 10 for, in Step (22), and acquires the identification information of an application satisfying the search conditions, in Step (23).

Next, in Step (24), the OS 14a displays a list of the searched candidates for the sharing destination application 64 on the LCD 18. Then, when the user selects any one from the list (Step (25)), in Step (26), the OS 14a returns an intent including the identification information of the selected application and the type and action used as the search conditions. Meanwhile, when receiving the intent from the OS 14a, in Step (27), the sharing source application 60 calls the API of the OS 14a, and designates the identification information of the selected application, the URI and type of the shared data and the action, which are included in the intent, and requests execution of the sharing function. Then, in Step (28), the OS 14a activates the sharing destination application 64 that is an application designated from the sharing source application 60, sets a screen of the sharing destination application 64 as the foreground, and notifies the URI and type of the shared data and the action notified from the sharing source application 60.

That is, a sharing function of the sharing source application 60 to notify the URI of the shared data and the like to the OS 14a without recognizing the sharing destination application 64 is referred to as the implicit sharing function, and a sharing function of the sharing source application 60 to designate the sharing destination application 64 and to notify the URI of the shared data and the like to the OS 14a is referred to as the explicit sharing function. In the meantime, the present application 14b will be described on the assumption that the present application 14b uses the explicit sharing function of the OS 14a.

<Operations of Mobile Terminal>

Figure 8:
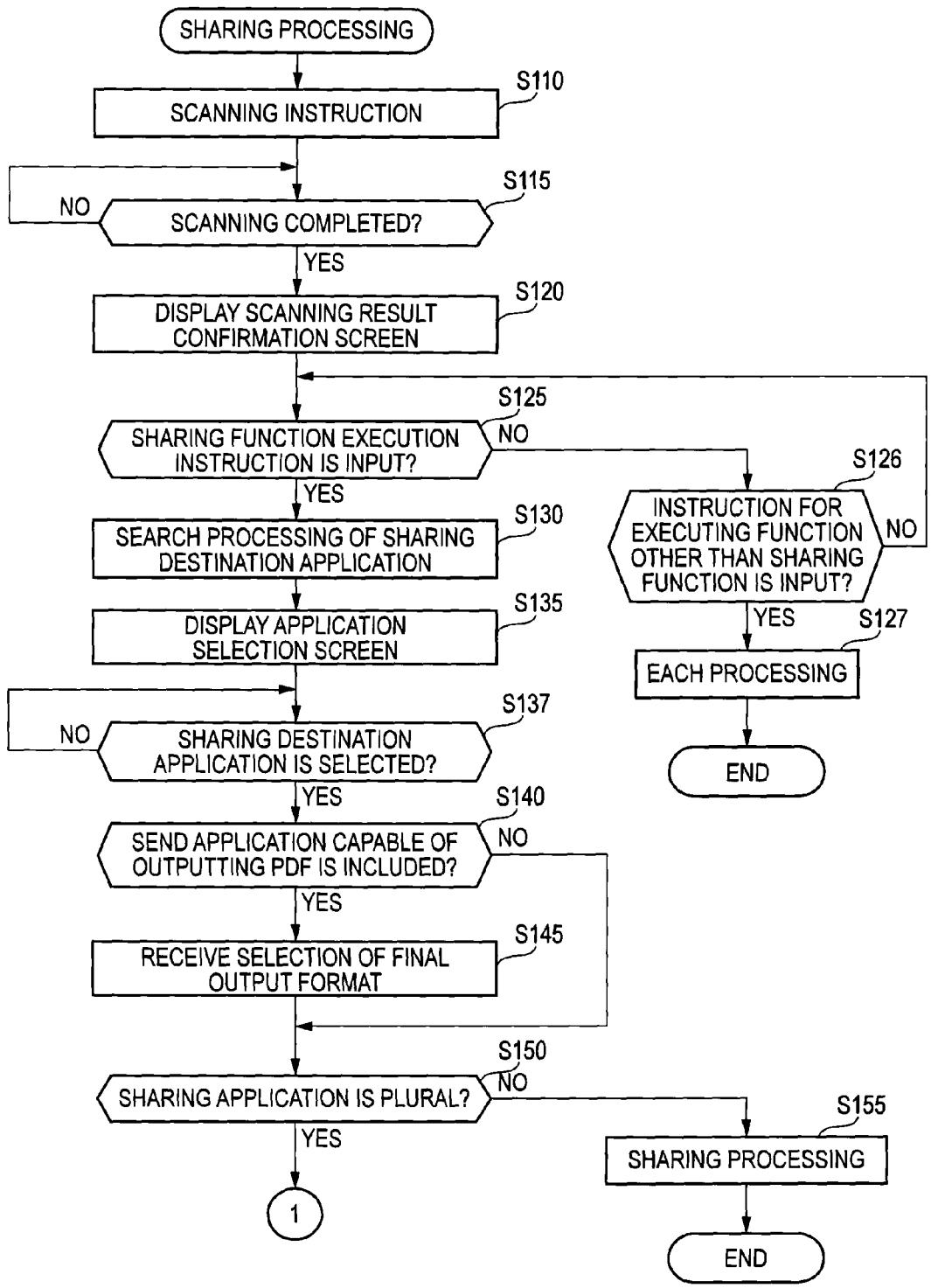
FIG. 8 is a flowchart showing sharing processing.
Figure 9:
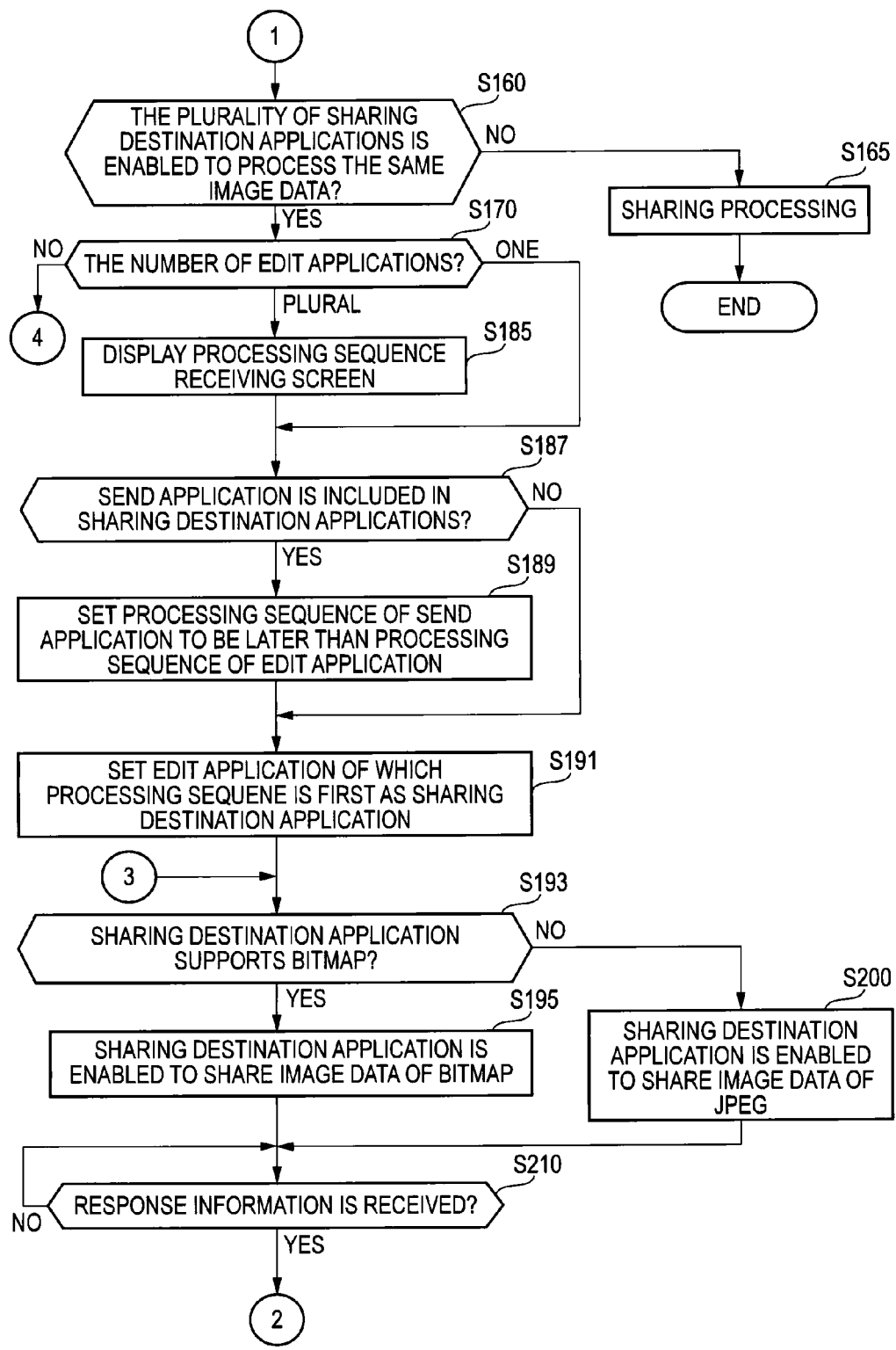
FIG. 9 is a flowchart showing the sharing processing.
Figure 10:
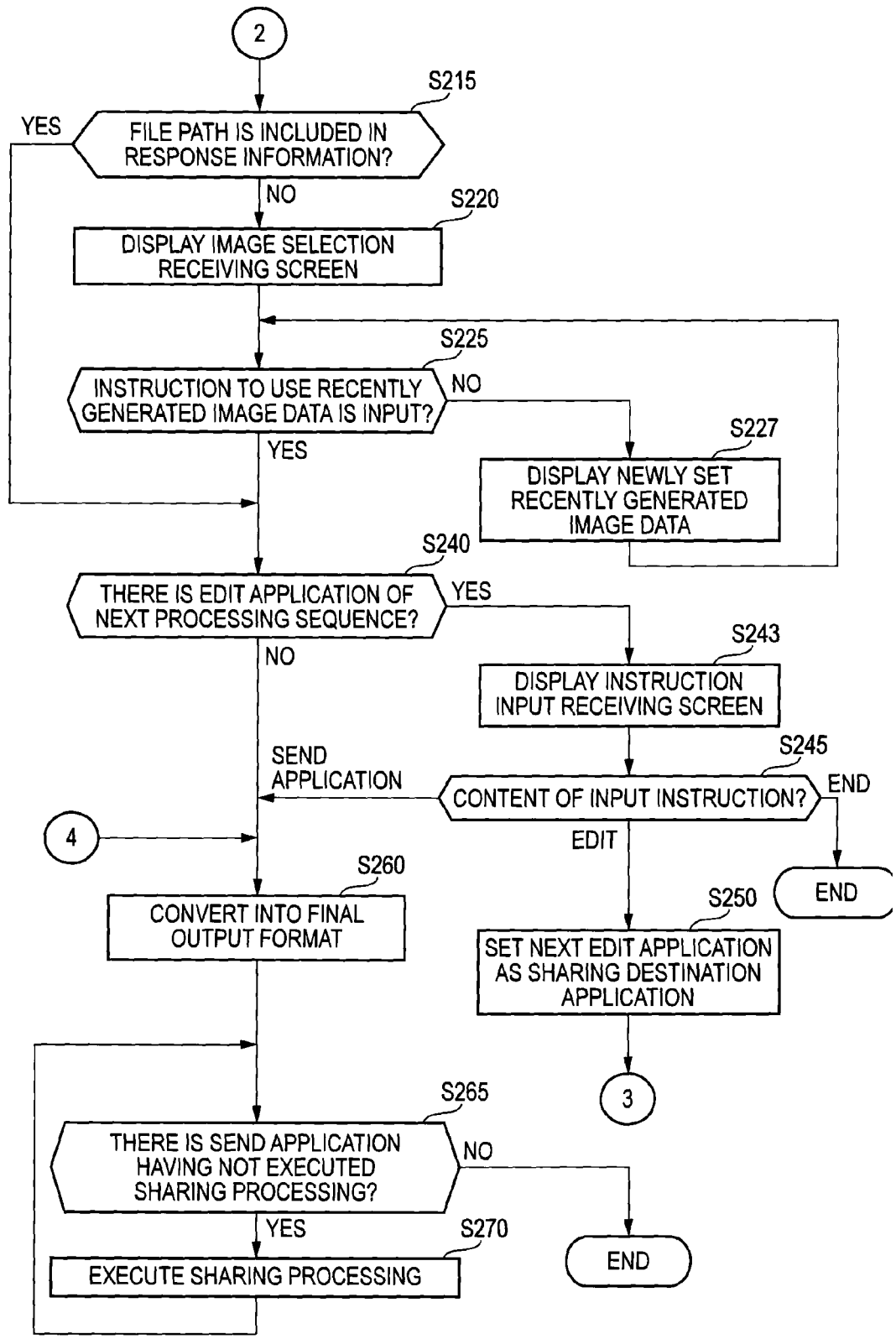
FIG. 10 is a flowchart showing sharing processing.

FIG. 8 is a flowchart showing sharing processing that is executed by the CPU 11 of the mobile terminal 10 in accordance with the present application 14b. The sharing processing starts when the user issues a scanning execution instruction through an operation receiving screen (not shown) of the present application 14b. Meanwhile, on the assumption that the present application 14b causes the CPU 11 to execute respective Steps shown in flowcharts of FIGS. 8 to 10 to be described later, or the present application 14b causes the CPU 11 to execute the Steps by using the functions of the OS 14a and the like, the Steps will be described. However, some Steps of each flowchart may be replaced with Steps that the OS 14a or other application causes the CPU 11 to perform. Also, some Steps of each flowchart may be replaced with Steps that are implemented by operations of hardware provided for the mobile terminal 10, irrespective of whether the CPU 11 is involved.

First, in Step S110 (hereinafter, Step is omitted), the CPU 11 instructs the device 30 to transmit image data, through the wireless LAN transceiver unit 15 (S110). Meanwhile, in response to the instruction from the mobile terminal 10, the device 30 scans one or more documents to generate one image data set including one or more image data, and transmits the image data set to the mobile terminal 10. The mobile terminal 10 temporarily stores the image data set received from the device 30 in the RAM 13. In the illustrative embodiment, it is assumed that the image data is uncompressed or reversibly compressed RAW image data. While the scanning is not completed in the device 30 (S115: NO), the CPU 11 is waiting. If the scanning is completed in the device 30 (S115: YES), the CPU 11 completes the reception of the image data set.

Figure 3:
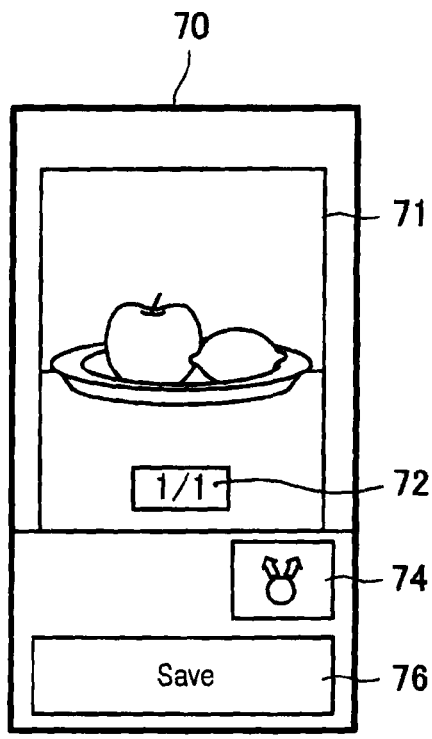
FIG. 3 illustrates a screen example of a scanning result confirmation screen.

The CPU 11 displays a scanning result confirmation screen 70 on the LCD 18 (S120). FIG. 3 shows a screen example of the scanning result confirmation screen 70. The scanning result confirmation screen 70 includes a scanned image 71, a page display area 72, a sharing button 74 and a save button 76. The scanned image 71 is an image corresponding to the image data generated by the scanning processing. The page display area 72 is an area for displaying a total number of pages of documents read by the device 30 and a page number indicating what page the scanned image 71 being currently displayed is in the documents of all pages. The sharing button 74 is an area for inputting a sharing function execution instruction. The save button 76 is an area for inputting a saving function execution instruction. When the user touches the save button 76, the image data being displayed scanned image 71 is saved. Specifically, the CPU 11 converts the image data into data of a predetermined format and calls the API of the OS 14a to store the data in the memory card 20.

In S125, the CPU 11 determines whether a sharing function execution instruction is input. The determination may be made by determining whether the sharing button 74 is touched. If a result of the determination is negative (S125: NO), the CPU 11 proceeds to S126 and determines whether an instruction for executing a function other than the sharing function is input. If a result of the determination in S126 is negative (S126: NO), the CPU 11 returns to S125, and if a result of the determination in S126 is positive (S126: YES), the CPU 11 proceeds to S127. In S127, the CPU 11 executes respective processing (for example, image data saving processing), in response to the operation input. Then, the CPU 11 ends the flowchart. When the flowchart is over, the CPU 11 displays an operation receiving screen (not shown) of the present application 14b on the LCD 18.

On the other hand, if a result of the determination in S125 is positive (S125: YES), the CPU 11 proceeds to S130. In S130, the CPU 11 searches the sharing destination application 64. Specifically, the CPU 11 requests the OS 14a to search an application satisfying conditions that (1) the application should support an EDIT action or SEND action, (2) the application can output data of a JPEG or PDF format and (3) the application should have a specification capable of outputting response information. That is, the OS 14a functions as a search unit configured to search an application matching the search conditions. Here, the response information is information indicating that the processing in the sharing destination application 64 is successful and is output from the sharing destination application 64. As information including the identification information of the application satisfying the search conditions is returned from the OS 14a, the CPU 11 proceeds to S135. As the information including the identification information of the application, an application name included in an intent of the Android (registered trademark of Google Inc.) may be exemplified.

Figure 4:
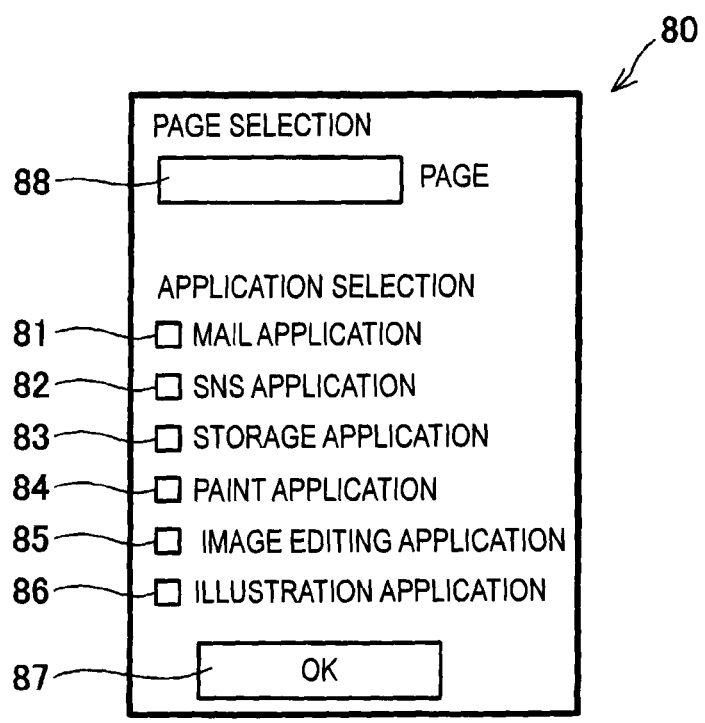
FIG. 4 illustrates a screen example of an application selection screen.

In S135, the CPU 11 displays a list of names of the searched applications on an application selection screen. FIG. 4 illustrates a screen example of an application selection screen 80. In the application selection screen 80, application names 81 to 86 that can be selected as the sharing destination application 64 are listed. The names 81 to 83 are information indicating SEND applications. The names 84 to 86 are information indicating EDIT applications. An OK image button 87 is an image for receiving a completion instruction input of a selection operation. A page input area 88 is an area for inputting a page number of image data, which is an execution target of the sharing processing, of the image data of the multiple pages generated by the scanning processing. The user can select the N (N: a natural number of 1 or larger) sharing destination applications 64 by using the application selection screen 80.

In S137, the CPU 11 determines whether a selection operation of the sharing destination application 64 is received. The selection operation of the sharing destination application 64 may be executed by touching at least one of the names 81 to 86 and finally touching the OK image button 87, for example. If a result of the determination is negative (S137: NO), the CPU 11 returns to S137, and if a result of the determination is positive (S137: YES), the CPU 11 proceeds to S140.

In S140, the CPU 11 determines whether a SEND application capable of outputting data of a PDF format is included in the N selected sharing destination applications 64. An example of the determination method is described. The CPU 11 requests the OS 14a to search a SEND application capable of outputting data of a PDF format. The CPU 11 receives the identification information of an application matching the search condition from the OS 14a. The CPU 11 determines whether an application having the identification information matching the received identification information exists in the N sharing destination applications 64. If a result of the determination in S140 is negative (S140: NO), the CPU 11 proceeds to S150, and if a result of the determination in S140 is positive (S140: YES), the CPU 11 proceeds to S145.

In S145, the CPU 11 receives a selection input of a final output format. The final output format is a format of data that is output to an apparatus other than the mobile terminal 10 by the SEND application. For example, it may be possible to select any one of the PDF format and the JPEG format, as the final output format. Then, the CPU 11 proceeds to S150.

In S150, the CPU 11 determines whether 'N' indicating the number of the selected sharing destination applications 64 is plural. If a result of the determination is negative (S150: NO), the CPU 11 proceeds to S155. In S155, the CPU 11 causes the one sharing destination application 64 to share the image data. Since this processing is the same as the sharing processing of the background art, the descriptions thereof are here omitted. Then, the CPU 11 ends the flowchart.

On the other hand, if a result of the determination in S150 is positive (S150: YES), the CPU 11 proceeds to S160. In S160, the CPU 11 determines whether the plurality of sharing destination applications 64 is enabled to process the same image data. If a result of the determination is negative (S160: NO), the CPU 11 proceeds to S165. In S165, the CPU 11 executes the sharing processing with respect to each of the plurality of image data by using the different sharing destination applications 64. For example, the CPU 11 executes the sharing processing with respect to the first image data by using the first sharing destination application 64 and executes the sharing processing with respect to the second image data by using the second sharing destination application 64. Since this processing is the same as the sharing processing of the background art, the descriptions thereof are here omitted. Then, the CPU 11 ends the flowchart.

On the other hand, if a result of the determination in S160 is positive (S160: YES), the CPU 11 proceeds to S170. In S170, the CPU 11 checks the number of EDIT applications included in the N sharing destination applications 64. If the EDIT application is not included (S170: NO), the CPU 11 proceeds to S260. If one EDIT application is included (S170: ONE), the CPU 11 skips over S185 and proceeds to S187. When a plurality of EDIT applications is included (S170: PLURAL), the CPU 11 proceeds to S185.

Figure 5:
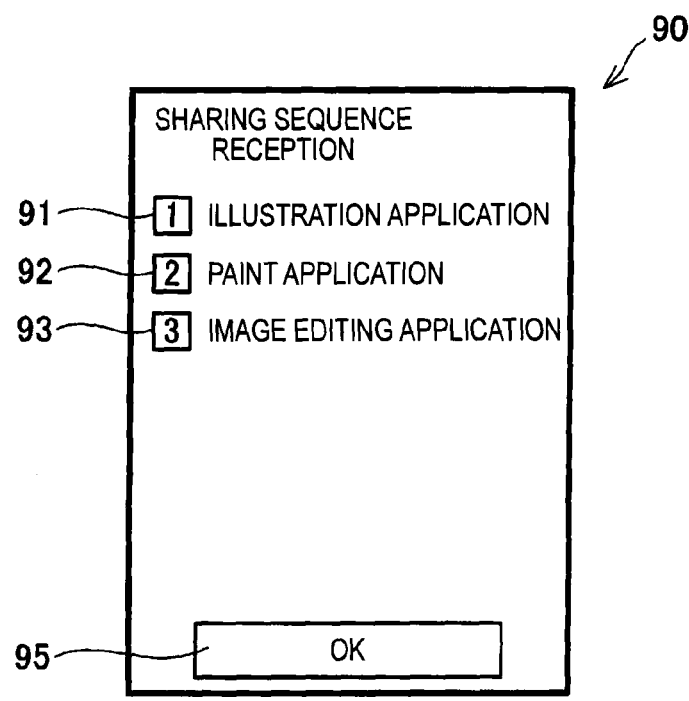
FIG. 5 illustrates a screen example of a processing sequence receiving screen.

In S185, the CPU 11 displays a processing sequence receiving screen on the LCD 18. The processing sequence receiving screen is a screen for receiving an input of a processing sequence in a case where the plurality of EDIT applications serially executes the processing with respect to the same image data. FIG. 5 illustrates a screen example of a processing sequence receiving screen 90. In the processing sequence receiving screen 90, names 91 to 93 of the multiple EDIT applications are displayed. A processing sequence of the EDIT application having the name 91 is first, a processing sequence of the EDIT application having the name 92 is second and a processing sequence of the EDIT application having the name 93 is third. A display sequence of the names 91 to 93 can be arbitrarily changed by the user's operation. An OK button image 95 is an image for receiving an input of an instruction determining the processing sequence. Then, the CPU 11 proceeds to S187.

In S187, the CPU 11 checks whether the SEND application is included in the N sharing destination applications 64. If a result of the determination is negative (S187: NO), the CPU 11 proceeds to S191, and if a result of the determination is negative (S187: YES), the CPU 11 proceeds to S189. In S189, the CPU 11 sets a processing sequence of the SEND application to be later than a processing sequence of the EDIT application in a case where the EDIT application and the SEND application serially execute the processing with respect to the same image data. Then, the CPU 11 proceeds to S191.

In S191, the CPU 11 sets the EDIT application of which processing sequence is first, as the sharing destination application 64.

In S193, the CPU 11 determines whether the sharing destination application 64 to be executed is the EDIT application supporting data of a bitmap format. An example of the determination method is described. The CPU 11 requests the OS 14a to search an EDIT application capable of processing image data of a bitmap format. The CPU 11 receives the identification information of an application matching the search condition from the OS 14a. The CPU 11 determines whether the identification information of the sharing destination application 64 to be executed coincides with the received identification information.

If a result of the determination in S193 is positive (S193: YES), the CPU 11 proceeds to S195. In S195, the CPU 11 executes the sharing processing for causing the sharing destination application 64 to share the image data of the bitmap format. Specifically, the CPU 11 calls the API of the OS 14a. Then, the CPU 11 designates the identification information of the sharing destination application 64, a URI of the image data to be shared, a type 'bitmap' and an action 'EDIT' and requests the OS 14a to execute the explicit sharing function. The URI of the image data to be shared may be a file path of the image data stored in the RAM 13. Also, the image data to be shared may be processed image data of a bitmap format stored in the RAM 13. The OS 14a having received the request for execution of the sharing function displays a screen of the sharing destination application 64 in the foreground. The present application 14b is to be waiting. Then, the CPU 11 proceeds to S210.

On the other hand, if a result of the determination in S193 is negative (S193: NO), the CPU 11 proceeds to S200. In S200, the CPU 11 executes the sharing processing for causing the sharing destination application 64 to share the image data of a JPEG format. When the image data to be shared has a bitmap format, the CPU 11 may convert the image data into a JPEG format and then enable the sharing destination application 64 to share the converted image data. In the meantime, since the sharing processing has been described in S195, the descriptions thereof are here omitted. Then, the CPU 11 proceeds to S210.

The sharing destination application 64 executes the sharing processing with respect to the image data to generate processed image data. For example, when the sharing destination application 64 is an EDIT application configured to change an image color from a color to monochrome, the sharing destination application 64 executes the sharing processing with respect to the image data representing a color image, thereby generating processed image data representing a monochrome image. The generated processed image data may be temporarily stored in the RAM 13, as a bitmap format. Also, when the sharing processing is completed, the sharing destination application 64 outputs response information to the OS 14a.

In S210, the CPU 11 determines whether the response information output from the sharing destination application 64 is received through the OS 14a. If a result of the determination is negative (S210: NO), the CPU 11 returns to S210, and if a result of the determination is positive (S210: YES), the CPU 11 proceeds to S215.

In S215, the CPU 11 determines whether the received response information includes a file path for accessing the processed image data stored in the RAM 13. If a result of the determination is positive (S215: YES), the CPU 11 sets the image data indicated by the file path as processing target image data and then proceeds to S240. Here, regarding the method of 'setting' the image data indicated by the file path as the processing target image data, a variety of methods can be used. For example, the file path included in the response information may be stored in the RAM 13 and the like, as a file path of the processing target image data. Also, for example, image data obtained by copying the image data indicated by the file path may be stored in the RAM 13 and the like, as the processing target image data. On the other hand, if a result of the determination in S215 is negative (S215: NO), the CPU 11 proceeds to S220.

Figure 6:
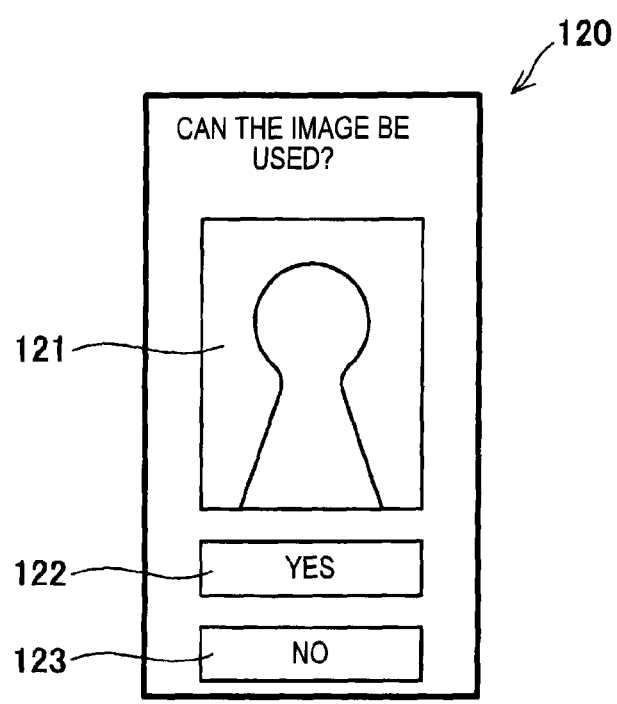
FIG. 6 illustrates a screen example of an image selection receiving screen.

In S220, the CPU 11 displays a recently generated image on an image selection receiving screen. FIG. 6 illustrates a screen example of an image selection receiving screen 120. The image selection receiving screen 120 includes a recently generated image 121, a YES button image 122 and a NO button image 123. The recently generated image 121 is an image formed by recently generated image data. The recently generated image data may be acquired by causing the OS 14a to search image data saved in the RAM 13 at the most recent time from the current time. The YES button image 122 is an image for receiving an input of an instruction to use, as the processed image data, the recently generated image data representing the recently generated image 121. The NO button image 123 is an image for receiving an input of an instruction not to use the recently generated image data, as the processed image data.

In S225, the CPU 11 determines whether an instruction to use the recently generated image data, as the processed image data, is input. If the YES button image 122 is touched (S225: YES), the CPU 11 sets the recently generated image data as the processing target image data and proceeds to S240. Here, regarding the method of 'setting' the recently generated image data as the processing target image data, a variety of methods can be used. Since the specific example has been described above, the descriptions thereof are here omitted. On the other hand, when the NO button image 123 is touched (S225: NO), the CPU 11 proceeds S227. In S227, the CPU 11 newly sets, as the recently generated image data, image data saved in the RAM 13 at earlier time before one than the currently selected recently generated image data. Then, the CPU 11 displays the recently generated image 121 formed by the newly set recently generated image data on the image selection receiving screen 120. Then, the CPU 11 returns to S225.

In S240, the CPU 11 determines whether there is an EDIT application of a next processing sequence. If a result of the determination is negative (S240: NO), the CPU 11 proceeds to S260, and if a result of the determination is positive (S240: YES), the CPU 11 proceeds to S243.

Figure 7:
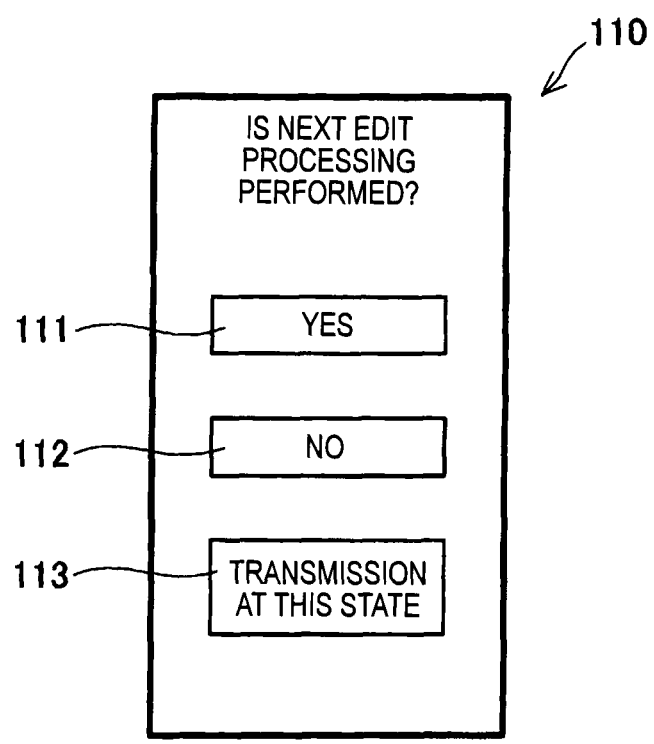
FIG. 7 illustrates a screen example of an instruction input receiving screen.

In S243, the CPU 11 displays an instruction input receiving screen on the LCD 18. The instruction input receiving screen is a screen for receiving an instruction input indicating whether or not to enable an EDIT application of a next processing sequence to execute the sharing processing. FIG. 7 illustrates a screen example of an instruction input receiving screen 110. The instruction input receiving screen 110 includes a YES button image 111, an ending button image 112 and a transmission execution button image 113. The YES button image 111 is an image for receiving an input of an instruction to enable an EDIT application of a next processing sequence to execute the sharing processing. The ending button image 112 is an image for receiving an input of an instruction to end the sharing processing. The transmission execution button image 113 is an image for receiving an input of an instruction to end the sharing processing of the EDIT application and to enable the SEND application to execute the sharing processing, irrespective of whether there is an EDIT application having not executed the sharing processing.

In S245, the CPU 11 confirms a content of the instruction input by the user. When the YES button image 111 is touched, the CPU 11 determines that the EDIT application of a next processing sequence is enabled to execute the sharing processing (S245: EDIT application), and proceeds to S250. In S250, the CPU 11 sets the EDIT application of a next processing sequence as the sharing destination application 64. Then, the CPU 11 returns to S193.

On the other hand, in S245, when the ending button image 112 is touched, the CPU 11 determines that the sharing processing is to be over (S245: ending), and ends the flowchart. Also, in S245, when the transmission execution button image 113 is touched, the CPU 11 determines that the SEND application is enabled to execute the sharing processing (S245: SEND application), and proceeds to S260.

In S260, when a selection input of the final output format is received in S145, the CPU 11 converts the format of the processed image data into the final output format.

In S265, the CPU 11 determines whether there is a SEND application having not executed the sharing processing. If a result of the determination is positive (S265: YES), the CPU 11 proceeds to S270. In S270, the CPU 11 executes the sharing processing of causing the SEND application to share the processed image data. Specifically, the CPU 11 calls the API of the OS 14a. Then, the CPU 11 designates the identification information of the sharing destination application 64, the URI of the image data of the final output format to be shared, a type of the final output format and an action 'SEND', and requests the OS 14a to execute the explicit sharing function. Then, the CPU 11 returns to S265.

On the other hand, if a result of the determination in S265 is negative (S265: NO), the CPU 11 determines that all processing is over, and ends the flowchart.

<Effects>

The present application 14b disclosed in the specification can receive the selection operation of the N (N: a natural number of 1 or larger) sharing destination applications 64, in S137. The present application 14b can enable the CPU 11 to execute the operation of causing each of the N sharing destination applications 64 to process the image data generated in the scanning processing of S115 (S195, S200, S270). Thereby, it is not necessary for the user to repeatedly perform the operation for causing the N sharing destination applications 64 to process the image data, with respect to each of the N sharing destination applications 64. Therefore, it is possible to improve the convenience.

When the SEND application capable of outputting the data of the PDF format is included in the N selected sharing destination applications 64 (S140: YES), it is possible to receive the selection input of the final output format (S145). Then, it is possible to make it possible for the SEND application to output the image data having the selected final output format (S260, S270). Thereby, it is possible to make it possible for the SEND application to output the image data having a format, which the user wants.

(1) It is possible to search an application satisfying conditions that (1) the application should support an EDIT action or SEND action, (2) the application can output data of a JPEG or PDF format and (3) the application should have a specification capable of outputting response information (S130). It is possible to display the list of the names of the searched applications on the application selection screen (S135) and to receive the user's operation of selecting the sharing destination application 64 (S137). Thereby, since it is possible to narrow the applications to be displayed on the application selection screen in advance, it is possible to improve the user's convenience. Also, since an application incapable of outputting the response information is not selected by the user, it is possible to prevent a situation where the processing of sequentially executing the plurality of sharing destination applications 64 is stopped on the way, for example.

When there is the EDIT application of a next processing sequence (S240: YES), the EDIT application of a next processing sequence is set as the sharing destination application 64 (S250) and the set sharing destination application 64 can be enabled to execute the sharing processing (S195, S200). Thereby, it is possible to enable the CPU 11 to execute the serial data processing of repeatedly executing, up to the $N^{th}$ data output destination application, an operation of making it possible for the $(i+1)^{th}$ (i: a natural number equal to or larger than 1 and equal to or smaller than (N−1)) sharing destination application 64 to process $i^{th}$ processed image data, which is data after the processing by the $i^{th}$ sharing destination application 64. Therefore, since it is possible to reduce a user's effort, it is possible to improve the convenience.

When the SEND application is included in the N sharing destination applications 64 (S187: YES), it is possible to set the processing sequence of the SEND application to be later than the processing sequence of the EDIT application (S189). Thereby, after executing all the sharing processing with respect to the image data by the EDIT application, it is possible to output the processed image data by the SEND application. Therefore, it is possible to prevent a situation where the image data is output by the SEND application before all the plurality of sharing processing, which is executed by the plurality of EDIT applications, is completed.

When the sharing destination application 64 to be executed is the EDIT application supporting the data of a bitmap format (S193: YES), it is possible to enable the sharing destination application 64 to share the image data by using the bitmap format. Since the bitmap format is an uncompressed format, it is possible to prevent an image quality of the image data from being deteriorated.

When the plurality of EDIT applications is included in the N sharing destination applications 64 (S170: PLURAL), it is possible to display the processing sequence receiving screen on the LCD 18 (S185). Thereby, it is possible to receive the input of the processing sequences of the plurality of EDIT applications (S185). Therefore, it is possible to reflect the user's intention on the sequence when serially executing the plurality of EDIT applications.

When there is the EDIT application of a next processing sequence (S240: YES), it is possible to display the instruction input receiving screen on the LCD 18 (S243). When an instruction for causing the EDIT application of a next processing sequence to execute the sharing processing is input (S245: EDIT application), it is possible to set the EDIT application of a next processing sequence as the sharing destination application 64 (S250). Thereby, it is possible to prevent the sharing processing from being executed by the EDIT application, which is not intended to execute the processing by the user.

When the file path of the processed image data is not included in the response information (S215: NO), the processed image data cannot be accessed. Therefore, it is necessary for the user to find out the processed image data. In this case, the present application 14b described in the specification can display the image selection receiving screen 120 including the recently generated image 121 on the LCD 18. There is a high possibility that the recently generated image data representing the recently generated image 121 is the processed image data, because it is recently generated. When the instruction to use the recently generated image data as the processed image data is input (S225: YES), it is possible to enable the sharing destination application 64 to share the recently generated image data. Thereby, since it is possible to reduce the user's effort to find out the processed image data, it is possible to improve the convenience.

Although the present invention has been described with reference to the illustrative embodiment, it is possible to easily infer that the present invention is not limited to the above illustrative embodiment and a variety of improvements and changes can be made without departing from the scope of the present invention.

The input of the user's search conditions may be received before the search processing of S130 is executed. For example, a search condition input receiving screen may be displayed on the LCD 18. The search condition input receiving screen is a screen for selecting a type of the action (SEND, EDIT, VIEW, CALL and the like) and a type of the output-table format (JPEG, PDF, bitmap, Portable Network Graphics (also referred to as PNG) and the like) used as the search conditions. In S130, the CPU 11 may request the OS 14a to search an application satisfying the search conditions selected by the user. Thereby, it is possible to display, on the application selection screen 80, an application for executing an action of a type selected by the user and an application for generating data having a format selected by the user. Since it is possible to display the application having a user's desired function on the application selection screen 80, as an option, it is possible to improve the user's convenience.

In S210, when the response information output from the $i^{th}$ sharing destination application 64 is received (S210: YES), if the file path of the $i^{th}$ processed image data processed in the $i^{th}$ sharing destination application 64 is included in the response information (S215: YES), a processing image confirmation screen may be displayed on the LCD 18. The processing image confirmation screen is a screen for displaying an image formed by the $i^{th}$ processed image data. Also, in the processing image confirmation screen, an instruction receiving image for receiving an input of an execution instruction of next sharing processing may be displayed. When the instruction receiving image is touched, the CPU 11 may enable the $(i+1)^{th}$ sharing destination application 64 to share the $i^{th}$ processed image data. Thereby, whenever the sharing processing in one sharing destination application 64 is completed, it is possible to enable the user to confirm the content of the processed image data. Since it is possible to easily confirm the progressing contents of the processing, it is possible to improve the user's convenience.

The processed image data generated by the sharing processing of S195 and S200 may be stored in the flash memory 14 or memory card 20. In this case, the response information output from the $i^{th}$ sharing destination application 64 in S210 may include a file path for accessing the $i^{th}$ processed image data stored in the flash memory 14 or memory card 20. Thereafter, the $(i+1)^{th}$ sharing destination application 64 may be enabled to share the $i^{th}$ processed image data stored in the flash memory 14 or memory card 20. Thereby, even when a capacity of the $i^{th}$ processed image data is larger, as compared to a remaining capacity of the RAM 13, for example, it is possible to transmit and receive the $i^{th}$ processed image data between the $i^{th}$ sharing destination application 64 and the $(i+1)^{th}$ sharing destination application 64.

The processing sequence when the plurality of EDIT applications serially executes the processing in S185 may be determined by the present application 14b. Thereby, since it is not necessary for the user to determine the processing sequence, it is possible to improve the convenience. The automatic determining processing of the processing sequence may be performed on the basis of a priority order table beforehand stored in the flash memory 14. The priority order table is a table in which a priority of the processing sequence is stored with respect to each of the plurality of EDIT applications. It may be possible to set a processing order to be higher (i.e., the sequence is earlier) with respect to the EDIT application having a higher priority order. For example, it may be possible to set the priority order to be higher with respect to the EDIT application configured to execute processing (for example, trimming processing) of reducing a capacity of the image data. Thereby, since it is possible to reduce the capacity of the image data at an earlier stage of the serial processing, it is possible to reduce a processing load in the entire serial processing.

In S193, the CPU 11 may determine whether the sharing destination application 64 to be executed is an EDIT application supporting a reversibly compressed format or uncompressed format. As the reversibly compressed format, a PNG and a Graphics Interchange Format (also referred to as GIF) may be exemplified. As the uncompressed format, a Quick-Draw Picture (also referred to as PICT) and a Tagged Image File Format (also referred to as TIFF) may be exemplified in addition to the bitmap. When the sharing destination application 64 is enabled to share the image data by using the reversibly compressed format or uncompressed format, it is possible to prevent the image quality of the image data from being deteriorated.

In S210, the present application 14b receives the response information output from the sharing destination application 64. However, the present invention is not limited thereto. For example, the present application 14b may not receive the response information. In this case, the present application 14b may instruct each of the N sharing destination applications 64 to transmit the processed image data to the sharing destination application 64 of a next processing sequence as the sharing processing is completed. Thereby, since the processing does not return to the present application 14b whenever the sharing processing is completed in the sharing destination application 64, it is possible to shorten the total processing time when the N sharing destination applications 64 are enabled to serially execute the sharing processing.

Regarding the method of searching the application having the specification outputting the response information in S130, a variety of methods may be used. For example, the server apparatus 52 may be configured to store therein a database of applications having the specification outputting the response information. The CPU 11 may access the server apparatus 52 through the wireless LAN transceiver unit 15 to read out the database, thereby searching an application having the specification outputting the response information. Thereby, it is possible to perform the search processing in the plurality of mobile terminals 10 by using the one database.

In S135, regarding the method of selecting the sharing destination application 64, a variety of methods can be used. For example, a list indicating contents of the selectable functions may be displayed on the application selection screen 80. As the contents of the functions of the EDIT application, a trimming, a retouch, a color conversion, a text insertion, a mirror-reverse and the like may be exemplified. As the contents of the functions of the SEND application, a mail transmission, an image upload to the SNS and an image upload to a storage on the Internet may be exemplified. In S137, it may be possible to receive a selection of N functions that the user wants.

In S245, if the ending button image 112 is touched (S245: ending), the CPU 11 may determine that the SEND application is enabled to execute the sharing processing, and proceed to S260.

Regarding the format of the image data that is used when transmitting and receiving the image data between the sharing destination applications 64, a variety of formats can be used. For example, the processed image data generated by the $i^{th}$ sharing destination application 64 may have a JPEG format and may be temporarily stored in the RAM 13. If the $(i+1)^{th}$ sharing destination application 64 supports data of a bitmap format (S193: YES), the processed image data of the JPEG format read out from the RAM 13 may be converted into the bitmap format and the converted processed image data may be shared by the $(i+1)^{th}$ sharing destination application 64.

Also, in the above illustrative embodiment, the case where the image data generated as the device 30 performs the scanning is used in S120 has been described. However, the image data is not limited thereto. For example, image data acquired by a digital camera embedded in the mobile terminal 10 may be used. Also, the image data beforehand stored in the flash memory 14 or memory card 20 may be used.

The processing of receiving the selection input of the final output format may be omitted. In this case, S145 may be omitted in the flowchart of FIG. 8. The format of the image data upon the execution of the sharing processing may be a predetermined format. In this case, the processing from S193 to S200 may be omitted in the flowchart of FIG. 9. If the response information does not include the file path of the processed image data (S215: NO), it may be possible to enable the user to find out the processed image data. In this case, the processing from S220 to S227 may be omitted in the flowchart of FIG. 10. If there is the EDIT application of a next processing sequence (S240: YES), the EDIT application of a next processing sequence may be necessarily set as the sharing destination application 64. In this case, the processing of S243 and S245 may be omitted in the flowchart of FIG. 10. Like this, generally speaking, an information processing program may enable a processor to function at least as an 'image data acquisition means', an 'identification image display control means' and a 'processing control means'. As a specific example, the CPU 11 may be configured to execute at least the processing of S120, S135, S195 or S200.

The image data set may be a set of a variety of image data. For example, when downloading a variety of data stored in the server apparatus 52 through the wireless LAN transceiver unit 15, a set of a plurality of image data acquired by the download processing may be defined as the 'image data set'. Also, when downloading a compressed folder, a set of a plurality of image data included in the compressed folder may be defined as the 'image data set'. Thereby, it is possible to make it possible for the different sharing destination applications 64 to share each of the plurality of image data included in the image data set acquired from the server apparatus 52.

In the above illustrative embodiment, an example of the format not supporting the multiple pages is the JPEG format and an example of the format supporting the multiple pages is the PDF format. However, the present invention is not limited thereto. For example, a variety of formats such as PNG, GIF, BMP and the like may be exemplified as the format not supporting the multiple pages. Also, a variety of formats such as DOC, XLS and the like may be exemplified as the format supporting the multiple pages.

According to the information processing program and the like described in the specification, it is possible to make it possible for the image processing apparatus to output the processed image data having a format, which the user wants.

According to the information processing program and the like described in the specification, it is possible to display, on the display unit, an application for executing a predetermined type of processing or an application for generating data having a predetermined type of a format. Since it is possible to narrow options in advance, it is possible to improve the user's convenience.

According to the information processing program and the like described in the specification, it is possible to display, on the display unit, an application for executing a type of processing selected by the user or an application for generating data having a type of a format selected by the user. Since it is possible to narrow the options in advance, it is possible to improve the user's convenience.

According to the information processing program and the like described in the specification, the data sharing unit can be enabled to execute an operation of sequentially executing the N data output destination applications one by one with respect to the image data. Therefore, since it is possible to reduce a user's effort, it is possible to improve the convenience.

According to the information processing program and the like described in the specification, after executing all of the various processing with respect to the image data, it is possible to output the image data after the processing, by the output application. Therefore, it is possible to prevent a situation where the image data is output before the various processing is all completed.

According to the information processing program and the like described in the specification, it is possible to transmit and receive the image data between the data output destination applications by using the reversibly compressed format or uncompressed format. Thereby, it is possible to prevent an image quality of the image data after the processing from being deteriorated.

According to the information processing program and the like described in the specification, it is possible to reflect a user's intention on the sequence when serially executing the data output destination applications.

According to the information processing program and the like described in the specification, it is possible to reflect a user's intention on the sequence when serially executing a plurality of applications (for example, a plurality of editing applications) of the same type.

According to the information processing program and the like described in the specification, the data sharing unit can be enabled to execute an operation of causing each of the N data output destination applications to serially process the image data.

According to the information processing program and the like described in the specification, it is possible to configure the data output destination application as an application having a specification outputting the response information. Thereby, it is possible to prevent a situation where the processing of sequentially executing the plurality of data output destination applications is stopped on the way.

According to the information processing program and the like described in the specification, it is possible to prevent processing, which is not intended by the user, from being executed with respect to the image data.

According to the information processing program and the like described in the specification, whenever the one data output destination application is completed, it is possible to enable the user to confirm the content of the image data after the processing.

According to the information processing program and the like described in the specification, even when it is not possible to access the image data generated by the data output destination application, it is possible to search the image data having a high possibility that the image data is the image data generated by the data output destination application, and to present the same to the user. Thereby, since it is possible to reduce the user's effort to find out the image data generated by the data output destination application, it is possible to improve the convenience.

According to the information processing program and the like described in the specification, it is possible to execute the plurality of data output destination applications with respect to the image data generated by the scanning processing.

According to the information processing program and the like described in the specification, even when a capacity of the image data after the processing is larger, as compared to a remaining capacity of the volatile memory, it is possible to transmit and receive the image data between the data output destination applications.

For example, in the above illustrative embodiment, the mobile phone 10 having a call function has been exemplified as the information processing device. However, a variety of apparatuses having no call function, such as a PC, a digital camera and the like, may be exemplified as the information processing device. Also, the present invention can be applied to an apparatus that is not provided with the touch panel 17 and is configured to input an operation through hard keys.

Also, in the above illustrative embodiment, the JPEG data and the PDF data are stored in the memory card 20 detachably mounted to the mobile phone 10. However, the data may also be stored in the flash memory 14 embedded in the mobile phone 10, for example.

Also, in the above illustrative embodiment, the OS 14a is an Android OS. However, the present invention can also be applied to an information processing device having another OS.

Also, in the above illustrative embodiment, the sharing function is implemented by the OS 14a. However, for example, the present invention can also be applied to a configuration where the sharing function is implemented by hardware or middleware.

Also, in the above illustrative embodiment, the mobile terminal 10 and the device 30 are connected by Wi-Fi. However, for example, the present invention can also be applied to a configuration where the mobile terminal 10 and the device 30 are connected by Bluetooth (registered trademark of Bluetooth SIG, Inc. in U.S.A.)

Also in the above illustrative embodiment, the names are used as the images for identifying the applications in the application selection screen 80 (refer to FIG. 4) or processing sequence receiving screen 90 (refer to FIG. 5). However, the present invention is not limited thereto. For example, as the images for identifying applications, icon images of the applications may be used.

Also, in the above illustrative embodiment, the present application 14b is configured to generate data in two formats of PDF and JPEG. However, the present invention can also be applied to a program configured to generate data in three or more formats.

Each of the 'image data acquisition means', the 'identification image display control means' and the 'processing control means' may be a single piece of hardware, or hardware that is configured to operate by executing the program of the present invention, or a program such as an operating system other than the present invention. Also, each of those means may be hardware that is configured to operate by a combination of processing to be executed by a plurality of programs.

The sharing source application 60 is an example of a data output source application. The sharing destination application 64 is an example of an output destination application. The CPU 11 is an example of a data sharing unit. The mobile terminal 10 is an example of an information processing device. The device control application 14b is an example of an information processing program. The CPU 11 is an example of a processor. The LCD 18 is an example of a display unit. The CPU 11 configured to execute S120 is an example of an image data acquisition means. The name is an example of an identification image. The CPU 11 configured to execute S135 is an example of an identification image display control means. The CPU 11 configured to execute S195 and S200 is an example of a processing control means. The SEND application is an example of an output application. The EDIT application is an example of an editing application. The OS 14a is an example of a search unit. The PNG and GIF are examples of a reversibly compressed format. The bitmap is an example of an uncompressed format. The file path is an example of access information. The instruction input receiving screen 110 is an example of an input receiving screen. The processing image confirmation screen is an example of a first instruction receiving screen. The image selection receiving screen 120 is an example of a second instruction receiving screen. The wireless LAN transceiver unit 15 is an example of a communication interface. The device 30 is an example of an image processing apparatus.

What is claimed is:

1. A non-transitory computer readable medium storing instructions, which is read in an information processing device having:
   a data sharing unit capable of sharing, the sharing being a process of causing an application, selected as data output destination from a plurality of applications, to process data output from a data output source application;
   a display;
   an human interface device; and
   a processor,
   the instructions, when executed by the processor, causing the information processing device to perform:
   acquiring image data;
   displaying identification images for identifying each of the plurality of applications on the display;
   receiving an input designating N identification images of the plurality of identification images displayed on the display from the human interface device, N being natural number greater than 1; and
   causing the data sharing unit to perform sharing the acquired image data to each of N data output destination application, each of N data output destination application respectively corresponding to each of the N identification images.

2. The non-transitory computer readable medium according to claim 1,
   wherein the plurality of applications comprises an output application outputting the image data to another device which is other than the information processing device, and,
   wherein the instructions cause the information processing device further to perform:
   receiving an input designating a format of output image data from the human interface device, output image data being data to be output to the other device by the output application in a case where the output application is included in the N data output destination application,
   causing the data sharing unit to perform sharing the image in the received format to the output application.

3. The non-transitory computer readable medium according to claim 1, wherein the instructions cause the information processing device further to perform searching a specific application satisfying a specific search condition from the plurality of applications; and
   wherein each of the identification images displayed on the display are respectively corresponding to each of applications satisfying the specific search condition.

4. The non-transitory computer readable medium according to claim 3, wherein the specific search condition includes at least one of a predetermined type of processing and a predetermined type of a format.

5. The non-transitory computer readable medium according to claim 3, wherein the instructions causes the information processing device further to perform receiving an input designating at least one of a predetermined type of processing and a predetermined type of a format from the human interface device, and
   wherein the specific search condition includes the at least one of the processing and the format designated by the input received from the human interface device.

6. The non-transitory computer readable medium according to claim 1, wherein the instructions causes the information processing device further to perform serial data processing comprising;
   acquiring process of acquiring ith processed image data, ith processed image data being an image data processed by an ith data output destination application, i being a natural number equal to or larger than 1 and equal to or smaller than N−1; and
   causing the data sharing unit to perform sharing the ith processed image data to (i+1)th data output destination application,
   repeatedly up to an Nth data output destination application.

7. The non-transitory computer readable medium according to claim 1,
   wherein the plurality of applications comprises an output application outputting the image data to another device which is other than the information processing device, and wherein the instructions cause the information processing device further to perform in a case where the output application is included in the N data output destination applications, setting a processing sequence, in which the acquired image data is shared to the output application later than another application.

8. The non-transitory computer readable medium according to claim 1,
wherein the plurality of applications comprises an editing application to edit the image data, and
wherein the instructions cause the information processing device further to perform in a case where the (i+1)th data output destination application is the editing application and is able to process data in a reversibly compressed format or uncompressed format, causing the sharing unit to perform sharing the acquired image data which is in the reversibly compressed format or uncompressed format to the (i+1)th data output destination application.

9. The non-transitory computer readable medium according to claim 6, wherein the instructions cause the information processing device further to perform:
displaying, on the display, a processing sequence receiving screen for receiving an input of a sequence in which the acquired image data is shared to the N data output destination applications to be serially.

10. The non-transitory computer readable medium according to claim 9,
wherein there is a plurality of types of the processing to be executed by the applications, and
wherein the instructions cause the information processing device further to perform in a case where a plurality of applications of the same type is included in the N data output destination applications, displaying the processing sequence receiving screen for receiving an input of a sequence in which the acquired image data is shared to the plurality of applications of the same type.

11. The non-transitory computer readable medium according to claim 10,
wherein the plurality of applications comprises an editing application for editing the image data, and
wherein the instructions cause the information processing device further to perform in a case where a plurality of the editing applications is included in the N data output destination applications, displaying the processing sequence receiving screen for receiving an input of a sequence in which the acquired image data is shared to the plurality of editing applications.

12. The non-transitory computer readable medium according to claim 1,
wherein the instructions cause the information processing device further to perform, after executing processing by an ith data output destination application, i being a natural number equal to or larger than 1 and equal to or smaller than N−1, in a case where response information indicating that the processing is successful is acquired from the ith data output destination application, causing the sharing unit to perform repeatedly sharing the acquired image data which is processed by the ith data output destination application to an (i+1)th data output destination application, up to an Nth data output destination application.

13. The non-transitory computer readable medium according to claim 12, wherein the instructions cause the information processing device further to perform:
extracting a supporting application having a configuration outputting the response information from the plurality of applications; and
displaying the identification image for identifying the extracted supporting applications on the display.

14. The non-transitory computer readable medium according to claim 6,
wherein the N data output destination applications comprise at least two editing application for editing the image data,
wherein the instructions cause the information processing device further to perform, when sharing unit is caused to perform sharing the acquired image data to ith data output destination application, which is the editing application, in a case where the (i+1)th data output destination application is the editing application, displaying, on the display, an input receiving screen for receiving an input indicating whether or not to cause the sharing unit to perform sharing the ith image data to the (i+1)th data output destination application, and
wherein, in response to receiving, from the human interface device, an input designating causing the sharing unit to perform sharing the ith image data to the (i+1)th data output destination application, causing the sharing the ith image data to the (i+1)th data output destination application.

15. The non-transitory computer readable medium according to claim 13,
wherein the N data output destination applications comprise at least one editing application for editing the image data,
wherein the instructions cause the information processing device further to perform:
after causing the sharing unit to perform sharing the acquired image data to ith data output destination application, which is the editing application, is performed, in a case where response information indicating that ith processed image data is generated is acquired from the ith data output destination application, displaying, on the display, a first instruction receiving screen comprising an image expressed by the ith processed image data; and
in response to receiving, from the human interface device, an input designating sharing instruction, causing the sharing unit to perform sharing the ith processed image data to the (i+1)th data output destination application.

16. The non-transitory computer readable medium according to claim 13,
wherein the N data output destination applications comprise at least one editing application for editing the image data,
wherein the instructions cause the information processing device further to perform when causing the sharing unit the acquired image data to the ith data output destination application, which is the editing application, is performed and the response information is acquired from the ith data output destination application, in a case where it is not possible to acquire access information for accessing the generated ith processed image data, displaying, on the display, a second instruction receiving screen comprising an image expressed by recently generated image data that is recently generated in the information processing device; and
in response to receiving, from the human interface device, an input designating sharing instruction, causing the sharing unit to perform sharing the recently generated image data to the (i+1)th data output destination application.

17. The non-transitory computer readable medium according to claim 1, wherein the information processing device further comprises a communication interface capable of performing communication an external device, and wherein the instructions, when executed by the processor, cause the information processing device further to perform operations of acquiring the image data from an image processing apparatus capable of executing scanning processing of scanning one or more documents to generate one or more image data, through the communication interface.

18. The non-transitory computer readable medium according to claim 1, wherein the information processing device further comprises a non-volatile storage unit configured to store therein a variety of data, and wherein the instructions, when executed by the processor, cause the information processing device further to cause the storage unit to store processed ith image data, which is data after processing by an ith data output destination application, and causes an (i+1)th data output destination application to process the processed ith image data stored in the storage unit.

19. An information processing device having:

a data sharing unit capable of sharing, the sharing being a process of causing an application, selected as data output destination from a plurality of applications, to process data output from a data output source application;

a display;

an human interface device; and a processor that, when executing instructions, performs:

acquiring image data;

displaying identification images for identifying the plurality of applications on the display; and receiving an input designating N identification images of the plurality of identification images displayed on the display from the human interface device, N being natural number greater than 1; and causing the data sharing unit to perform sharing the acquired image data to each of N data output destination application, each of N data output destination application respectively corresponding to each of the N identification images.

20. A control method of an information processing device having a data sharing unit causing an application, selected as data output destination from a plurality of applications, to process data output from a data output source application, the information processing device comprising a display and an human interface device, the control method comprising:

acquiring image data;

displaying identification images for identifying the each of plurality of applications on the display;

receiving an input designating N identification images of the plurality of identification images displayed on the display from the human interface device, N being natural number greater than 1; and causing the data sharing unit to perform sharing the acquired image data to each of N data output destination application, each of N data output destination application respectively corresponding to each of the N identification images.

* * * * *